United States Patent
Chen et al.

(10) Patent No.: US 10,498,632 B2
(45) Date of Patent: Dec. 3, 2019

(54) CONSTRAINED RELIABLE MULTICAST IN A DIRECTED ACYCLIC GRAPH BASED ON DEFERRED CONTENTION TO HIGHER DEVICES

(71) Applicant: Cisco Technology, Inc., San Jose, CA (US)

(72) Inventors: Jianzhou Chen, Nanjing (CN); Pascal Thubert, La Colle sur Loup (FR); Huimin She, Shanghai (CN); Feiliang Wang, Shanghai (CN); Chuanwei Li, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/971,004

(22) Filed: May 4, 2018

(65) Prior Publication Data

US 2019/0342204 A1    Nov. 7, 2019

(51) Int. Cl.
*H04L 12/761* (2013.01)
*H04L 12/753* (2013.01)
*H04L 12/751* (2013.01)
*H04L 12/705* (2013.01)
*H04L 12/24* (2006.01)

(52) U.S. Cl.
CPC .............. *H04L 45/16* (2013.01); *H04L 45/02* (2013.01); *H04L 45/18* (2013.01); *H04L 45/48* (2013.01); *H04L 41/12* (2013.01)

(58) Field of Classification Search
None
See application file for complete search history.

(56) References Cited

U.S. PATENT DOCUMENTS 9,900,169 B2    2/2018  Thubert et al.
2004/0264495 A1*  12/2004  Nandagopalan .... H04L 12/2801
                                                        370/462

(Continued)

FOREIGN PATENT DOCUMENTS

CN          107579863 A      1/2018
EP          2661050 A1      11/2013

OTHER PUBLICATIONS

Kumar et al., "BIER Use Cases", [online], Jan. 16, 2018, [retrieved on Apr. 17, 2018]. Retrieved from the Internet: URL: <https://tools.ietf.org/pdf/draft-ietf.bier-use-cases-06.pdf>, pp. 1-17.

(Continued)

*Primary Examiner* — Alex Skripnikov
(74) *Attorney, Agent, or Firm* — Leon R. Turkevich

(57) ABSTRACT

A network device receives a data packet sourced from a root of a tree-based topology and including a data structure identifying transmitted data packets transmitted by the root; in response to determining one or more absent transmitted data packets based on the data structure, the network device starts a deferred transmission timer requiring the network device to wait a first half of a selected minimum contention interval before attempting transmission to a parent at a randomized position within a second half of the selected minimum contention interval, the selected minimum contention interval based on the distance to the root and at least twice that of the parent; the network device selectively transmits a control message to the parent to request the absent transmitted data packets only if, upon reaching the corresponding randomized position of the deferred transmission timer, the network device has not received the absent transmitted data packets.

20 Claims, 9 Drawing Sheets

(56) References Cited

U.S. PATENT DOCUMENTS

| | | | |
|---|---|---|---|
| 2011/0268139 A1* | 11/2011 | Caracas | H04J 3/0652 370/503 |
| 2012/0158933 A1* | 6/2012 | Shetty | H04L 41/12 709/223 |
| 2013/0332647 A1 | 12/2013 | Rabeler et al. | |
| 2015/0055498 A1* | 2/2015 | Sulc | H04W 40/20 370/252 |
| 2015/0078204 A1 | 3/2015 | Thubert et al. | |
| 2015/0373735 A1 | 12/2015 | Thubert et al. | |
| 2016/0212740 A1 | 7/2016 | Hui et al. | |
| 2016/0308793 A1 | 10/2016 | Levy-Abegnoli et al. | |
| 2017/0222920 A1 | 8/2017 | Thubert et al. | |
| 2018/0070379 A1 | 3/2018 | Thubert et al. | |

OTHER PUBLICATIONS

Named Data Networking, [online], Oct. 2017, [retrieved on Apr. 18, 2018]. Retrieved from the Internet: URL: <https://named-data.net/>, pp. 1-11.

Levis et al., "The Trickle Algorithm", Internet Engineering Task Force (IETF), Request for Comments: 6206, Mar. 2011, pp. 1-13.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Hui et al., "Multicast Protocol for Low-Power and Lossy Networks (MPL)", Internet Engineering Task Force (IETF), Request for Comments: 7731, Feb. 2016, pp. 1-29.

Wijands, Ed., et al., "Multicast Using Bit Index Explicit Replication (BIER)", Internet Engineering Task Force (IETF), Request for Comments: 8279, Nov. 2017, pp. 1-43.

Levis et al., "Trickle: A Self-Regulating Algorithm for Code Propagation and Maintenance in Wireless Sensor Networks", [online], [retrieved on Apr. 17, 2018]. Retrieved from the Internet: URL: <http://csl.stanford.edu/~pal/pubs/trickle-nsdi04.pdf>, 14 pages.

Thubert et al., U.S. Appl. No. 15/902,028, filed Feb. 22, 2018.

Thubert et al., U.S. Appl. No. 15/954,786, filed Apr. 17, 2018.

* cited by examiner

CONSTRAINED RELIABLE MULTICAST IN A DIRECTED ACYCLIC GRAPH BASED ON DEFERRED CONTENTION TO HIGHER DEVICES

TECHNICAL FIELD

The present disclosure generally relates to constrained reliable multicast in a directed acyclic graph based on deferred contention to higher devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Multicasting can be used to propagate data messages throughout a data network, in some cases independent of any routing topology. Such topology-independent multicasting can include network devices multicasting respective control messages to identify any missing data messages that can be exchanged between the network devices.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
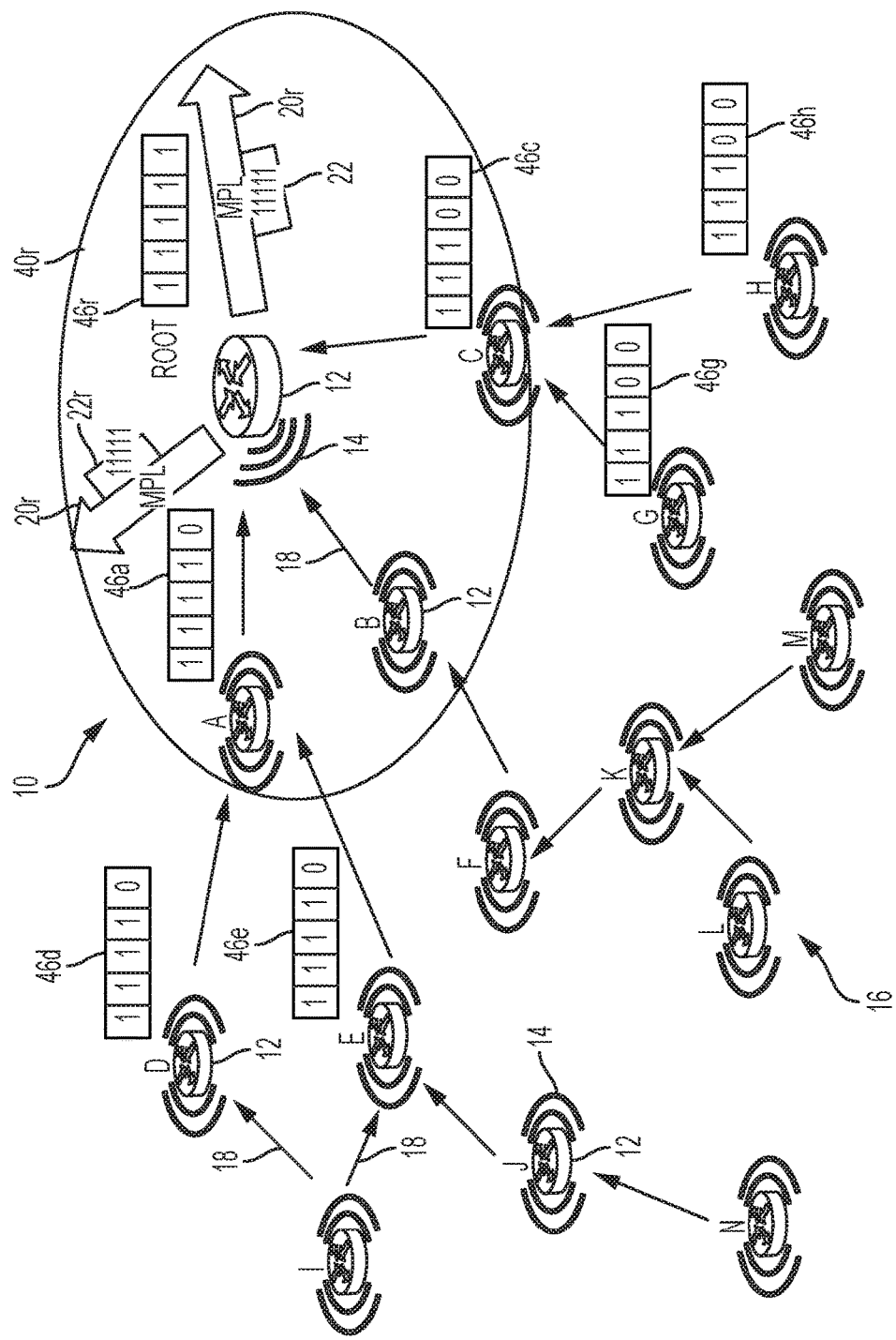
FIGS. 1A-1E illustrates an example data network having RPL network devices for executing deferred transmission operations for constrained reliable multicast in a tree-based topology such as a directed acyclic graph (DAG), according to an example embodiment.

In one embodiment, a method comprises receiving, by a network device via a tree-based topology of a data network, a data packet sourced from a root network device of the tree-based topology, the data packet including a data structure identifying transmitted data packets having been transmitted by the root network device; determining, by the network device, a distance to the root network device via the tree-based topology; determining, by the network device, one or more absent transmitted data packets based on the data structure; the network device starting, in response to determining the one or more absent transmitted data packets, a deferred transmission timer that defers to a parent device based on requiring the network device to wait at least a first half of a selected minimum contention interval before attempting transmission at a randomized position within a second half of the selected minimum contention interval, the starting including setting the selected minimum contention interval to at least twice the corresponding selected minimum contention interval of the parent device based on the distance; and the network device selectively transmitting a control message to the parent device to cause transmission of the one or more absent transmitted data packets only if, upon reaching the corresponding randomized position of the deferred transmission timer, the network device has not received the one or more absent transmitted data packets.

In another embodiment, an apparatus comprises a device interface circuit and a processor circuit. The device interface circuit is configured for receiving, via a tree-based topology of a data network, a data packet sourced from a root network device of the tree-based topology. The data packet includes a data structure identifying transmitted data packets having been transmitted by the root network device. The processor circuit is configured for determining a distance to the root network device via the tree-based topology, and further configured for determining one or more absent transmitted data packets based on the data structure. The processor circuit further is configured for starting, in response to determining the one or more absent transmitted data packets, a deferred transmission timer that defers to a parent device based on requiring the apparatus to wait at least a first half of a selected minimum contention interval before attempting transmission at a randomized position within a second half of the selected minimum contention interval. The processor circuit is configured for setting the selected minimum contention interval to at least twice the corresponding selected minimum contention interval of the parent device based on the distance. The processor circuit further is configured for selectively causing the device interface circuit to transmit a control message to the parent device to cause transmission of the one or more absent transmitted data packets only if, upon reaching the corresponding randomized position of the deferred transmission timer, the apparatus has not received the one or more absent transmitted data packets.

In another embodiment, one or more non-transitory tangible media are encoded with logic for execution by a machine and when executed by the machine operable for: receiving, by the machine implemented as a network device via a tree-based topology in data network, a data packet sourced from a root network device of the tree-based topology, the data packet including a data structure identifying transmitted data packets having been transmitted by the root network device; determining, by the network device, a distance to the root network device via the tree-based topology; determining, by the network device, one or more absent transmitted data packets based on the data structure; the network device starting, in response to determining the one or more absent transmitted data packets, a deferred transmission timer that defers to a parent device based on requiring the network device to wait at least a first half of a selected minimum contention interval before attempting transmission at a randomized position within a second half of the selected minimum contention interval, the starting including setting the selected minimum contention interval to at least twice the corresponding selected minimum contention interval of the parent device based on the distance; and the network device selectively transmitting a control message to the parent device to cause transmission of the one or more absent transmitted data packets only if, upon reaching the corresponding randomized position of the deferred transmission timer, the network device has not received the one or more absent transmitted data packets.

Detailed Description

Particular embodiments optimize dissemination of multiple data packets that need to be received by every network device in a data network, for example data packets carrying firmware code fragments that need to be reassembled into executable code for deployment in each of the network devices. The particular embodiments optimize dissemination of the multiple data packets by utilizing advantageous structures of a tree-based network topology, for example a DAG, in a manner that provides a constrained and reliable multicast of the data packets throughout the DAG.

An example conventional deployment of multicasting in a low power and lossy network is described in the Internet Engineering Task Force (IETF) Request for Comments (RFC) 7731, entitled "Multicast Protocol for Low-Power and Lossy Networks (MPL)." RFC 7731 describes multicasting forwarding in an LLN without any multicast routing topology: messages are multicast to all network devices in a multicast domain using the "Trickle" algorithm as described in RFC 6206. RFC 7731 specifies that each network device can multicast transmit to a link-scoped MPL Domain Address (i.e., broadcast), according to the Trickle algorithm, a control message specifying a minimum sequence number and a corresponding bit vector identifying sequence numbers of data messages buffered by the corresponding broadcasting network device: a network device receiving a control message can identify missing data packets that need to be sent in response to detecting inconsistencies between the received bit vector and its stored data structures (e.g., its stored Seed Set and/or its stored Buffered Message Set), and in response initiate a new trickle timer to transmit the missing data packet to the broadcasting network device having sent the control message.

The multicast transmission of control messages as described in RFC 7731, however, can result in unnecessary transmissions in the data network and can impede propagation of data messages sourced by (i.e., originated by) a root network device into the tree-based DAG topology. For example, if network device "H" of FIG. 1A were to broadcast a MPL control message according to RFC 7731 indicating it was missing a data packet, neighboring network devices "C" and "G" according to RFC 7731 each could respond to the MPL control message from network device "H" by duplicate multicasting of the missing data packet, resulting in the network device "H" receiving two copies of the missing data packet from network devices "C" and "G"; moreover, the multicast transmissions of the MPL control message from the network device "H", and/or the multicast transmissions of the missing data packet from network devices "C" and/or "G" according to RFC 7731 could interfere with a new data packet transmission by the root network device and/or the parent network device "C".

Consequently, large-scale firmware upgrades using conventional multicast deployments according to RFC 7731 can result in substantially long delays in deploying the firmware upgrades (on the order of days), where a field area network (FAN) deployment for a smart utility system ("smart grid") such as advanced metering infrastructure (AMI) and/or distributed automation (DA) can have thousands of FANs and millions of "Internet of Things" (IoT)/LLN devices, where each FAN can utilize a connected grid mesh (CG-Mesh) that comprises a field area router (FAR) and thousands of network devices (e.g., IoT/LLN devices) in the corresponding FAN.

FIGS. 1A-1E illustrates an example data network 10 having RPL network devices 12 for executing deferred transmission operations for constrained reliable multicast in a tree-based topology such as a directed acyclic graph (DAG), according to an example embodiment. Each of the network devices (e.g., "Root", "A" through "N") 12 can be configured for establishing a tree-based network topology 16, for example a Directed Acyclic Graph (DAG) or a Destination Ordered DAG (DODAG), via wired or wireless data links 14, for example according to RPL as specified in the IETF RFC 6550, including executing a prescribed transmission operation such as the Trickle algorithm according to RFC 6206. As illustrated in FIG. 1, the tree-based topology 16 includes a root network device "Root" 12 and child network devices "A" through "N" forming one or more attachments (illustrated as an arrow pointing from the corresponding child device to the corresponding parent device) 18 to the "Root" network device 12 and/or another child network device 12.

Although only the network devices "Root", "B", and "D", and "J" are labeled with the reference numeral "12" in FIGS. 1A-1E to avoid cluttering in the Figures, it should be apparent that all the network devices "Root" and "A" through "N" are allocated the reference numeral "12" for purposes of the description herein. Further, it should be apparent that all the network devices "Root" and "A" through "N" 12 are configured for establishing wired or wireless data links 14 (illustrated as curved lines radiating from each device 12), and attachments 18 via the wireless data links, even though only the wireless data links for the network devices "Root" and "J" 12 are labeled with the reference numeral "14" and only the attachments "B→Root", "I→D", and "I→E" are labeled with the reference numeral "18" to avoid cluttering in the Figures.

According to example embodiments, dissemination of multiple data packets (e.g., multicast data packets 20r in FIG. 1A) can be optimized by utilizing advantageous structures of the tree-based network topology 16, in a manner that minimizes delays in disseminating the data packets 20 throughout the tree-based network topology based on providing a constrained and reliable multicast of the data packets 20 throughout the tree-based network topology 16.

The example embodiments can eliminate the multicast/broadcasting of control messages based on providing, in each data packet (e.g., 20r of FIG. 1A) carrying payload data (e.g., a corresponding executable code fragment for reassembly by each network device), a data structure (also referred to herein as a transmit-history bit vector) 22 that identifies the data packets that have already been transmitted by the root network device 12 (i.e., "transmitted data packets"). Hence, the root network device 12 can output, for each data packet 20 carrying a corresponding executable code fragment, a corresponding sequence identifier that uniquely identifies the data packet 20, and a corresponding updated data structure 22 that identifies the transmitted data packets; hence, each network device 12 receiving a data packet 20 can determine from the corresponding data structure 22 whether the network device has failed to receive one or more of the transmitted data packets (i.e., "absent transmitted data packets"), without the necessity of exchanging control messages with other neighboring network devices.

Moreover, the example embodiments can minimize interference in dissemination of data packets 20 throughout the data network based on minimizing the transmission of control messages (24 of FIG. 1C) generated in response to a determination of absent transmitted data packets: any control message 24 sent by any network device (e.g., "C" in FIG. 1C) 12 can minimize interference by being unicast transmitted only to its preferred parent device (e.g., "Root" 12 in FIG. 1C) using the unicast address (e.g., IPv6 address) of the preferred parent (e.g., "Root" 12 in FIG. 1C), as opposed to a link-scoped MPL domain address as in RFC 7731.

Further, any network device 12 attempting to transmit a control message 24 for retransmission of an absent packet first starts a deferred transmission timer, for example a Trickle timer, that has a selected minimum contention interval (I_D) (e.g., 26g, 26h of FIG. 1C) that is at least twice the duration of a corresponding selected minimum contention interval (I_P) (e.g., 28c of FIG. 1C) of a parent network device, where the selected minimum contention interval "I_D" (e.g., 26g, 26h of FIG. 1C) is a multiple of a prescribed selected contention interval "I0" based on the distance (e.g., number of hops "H") from the root network device (e.g., "I_D≥2*I0*H+RND", where "*" represents a multiplication operation and "RND" is a random number that provides variation in the selected minimum contention intervals between "peer" network devices (e.g., "G" and "H") 12 having the same distance from the root network device "Root" 12. The prescribed selected contention interval "I0" is used herein as a reference for the "current interval size" that can be used by the root network device "Root" 12, for example between a prescribed minimum contention interval "Imin" and a prescribed maximum contention interval "Imax", i.e., "Imin≤I0≤Imax", as described for example in RFC 6206.

Consequently, since the selected minimum contention interval "I_D" 26 used by a child network device is a multiple of the prescribed selected contention interval "I0" (used by the root network device 12) based on the distance from the root network device, the selected minimum contention interval 26 for a network device (e.g., "G", "H") 12 increases as a network device 12 has a further distance (e.g., higher hop count) from the root network device 12, providing parent network devices (e.g., "C") an earlier opportunity to unicast transmit "up" toward the root network device "Root" 12 a control message 24 for retransmission of one or more absent transmitted data packets.

Hence, the use of deferred transmission timers, relative to respective distances from the root network device of the tree-based topology 16, enables a parent network device (e.g., "C" in FIG. 1C) to send to its parent (or the root network device, as appropriate within the tree-based topology 16) a control message 24 requesting transmission of an absent transmitted data packet, prior to any of its child network devices (e.g., "G", "H"); hence, a parent network device (e.g., "C") in most cases can acquire the absent transmitted data packet (30r of FIG. 1D) and retransmit the absent transmitted data packet (30c of FIG. 1E) to its child network devices (e.g., "G" and "H" of FIG. 1E), eliminating the necessity of the child network devices ever transmitting a control message. In other words, the example embodiments enable a parent device (e.g., "C") 12 to "correct" for the absent transmitted data packet before a child network device (e.g., "G" and "H") reaches a randomized position 32 within a second half of its selected minimum contention interval.

Hence, the example embodiments enable a constrained reliable multicast in a directed acyclic graph, where a network device (e.g., "G" and/or "H") executes deferred contention to higher network devices (e.g., "C") closer to the root network device, as the network device 12 can selectively unicast transmit a control message 24, only to its parent device, requesting transmission of an absent transmitted data packet only if, upon reaching the corresponding randomized position of its deferred transmission timer, the network device has not received the absent transmitted data packet.

Figure 1B:
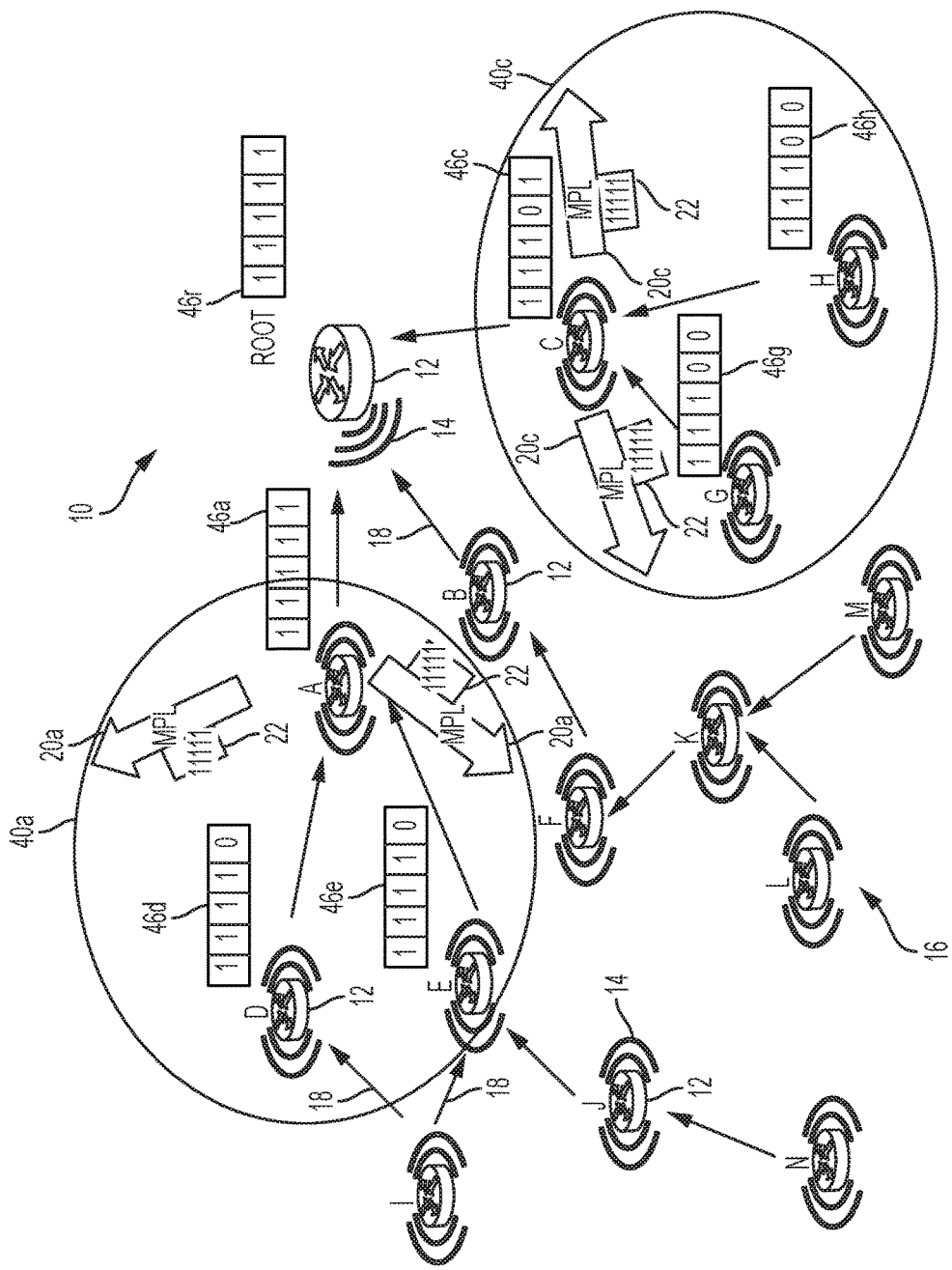
Figure 1C:
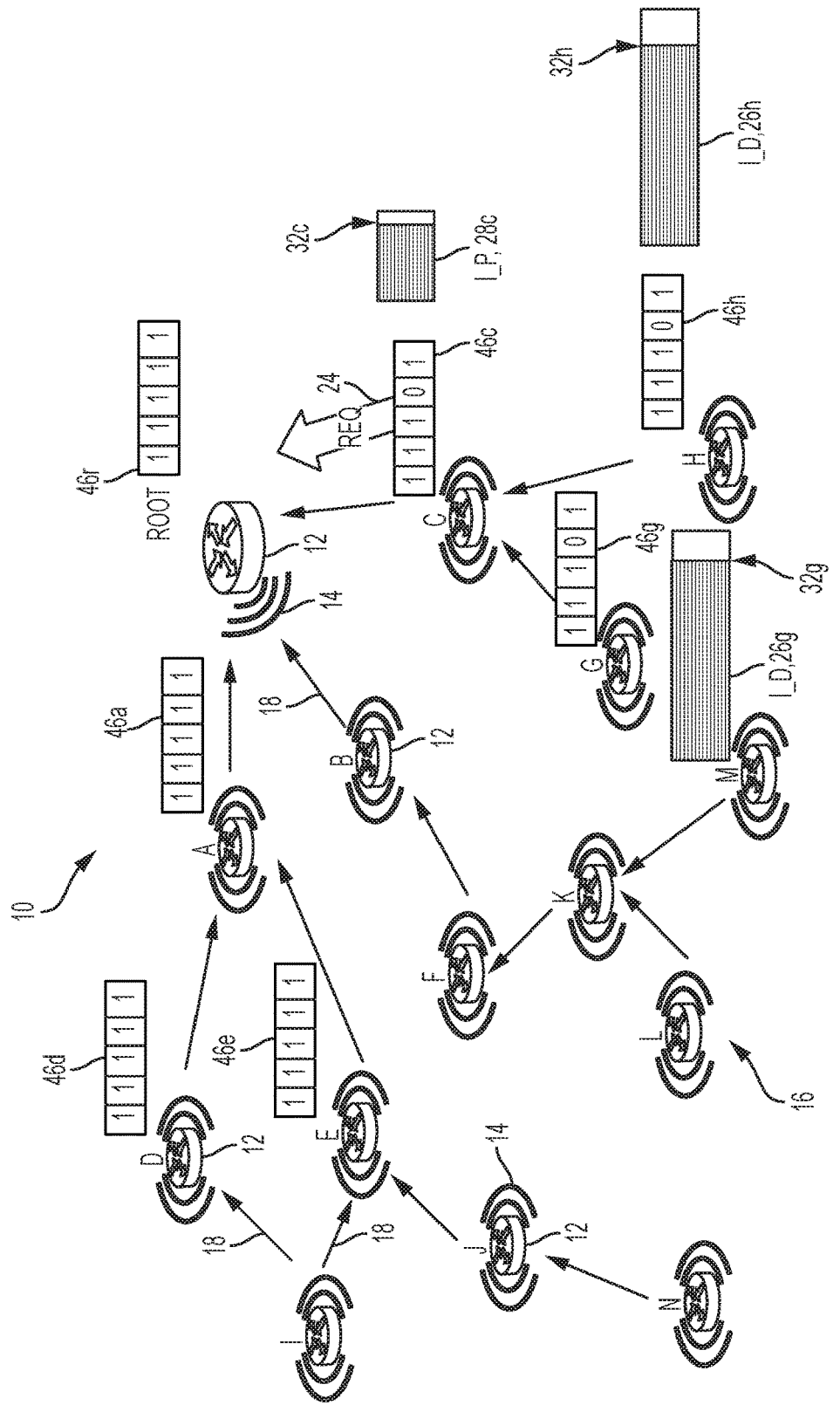
Figure 1D:
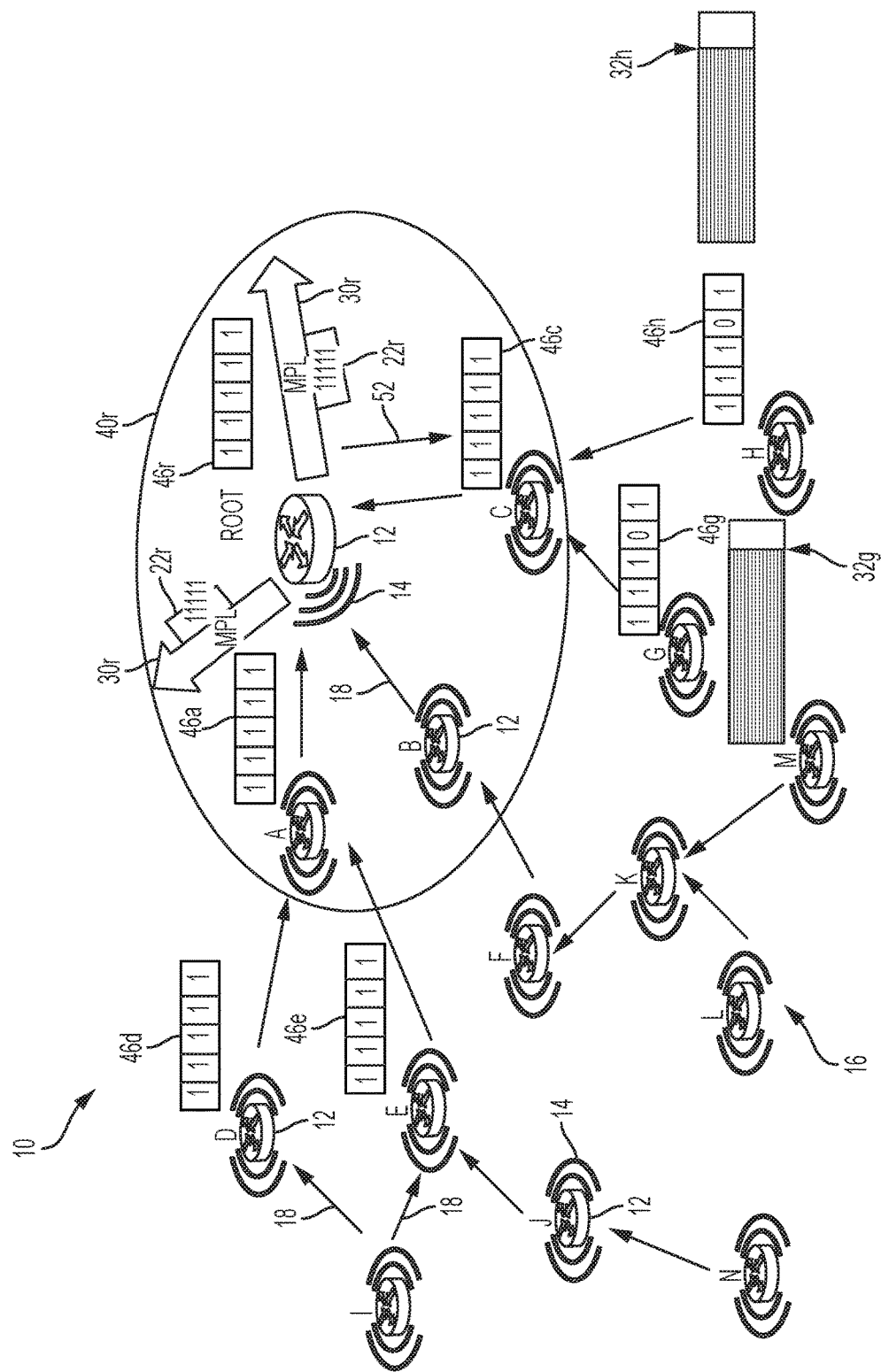
Figure 1E:
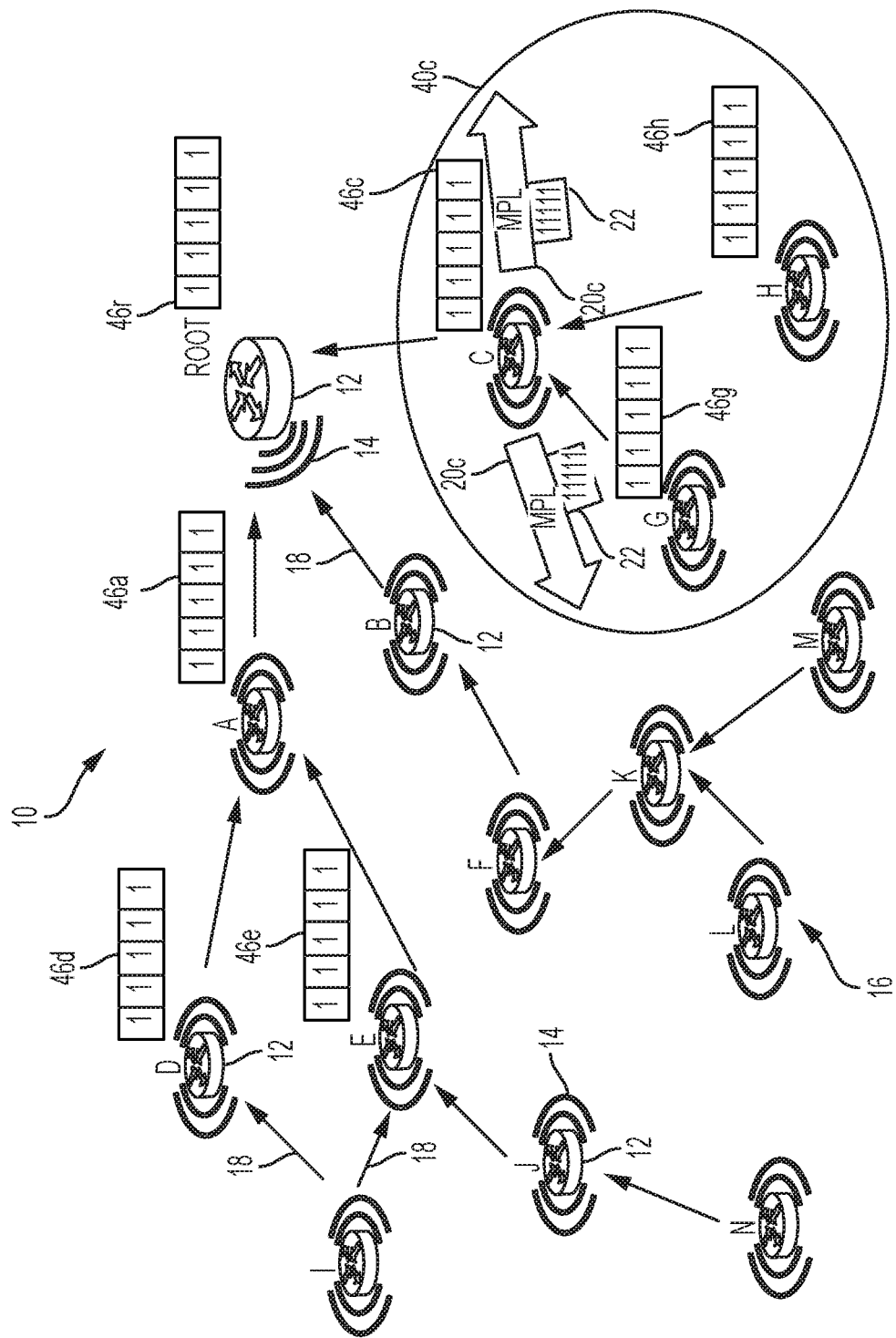
Figure 2:
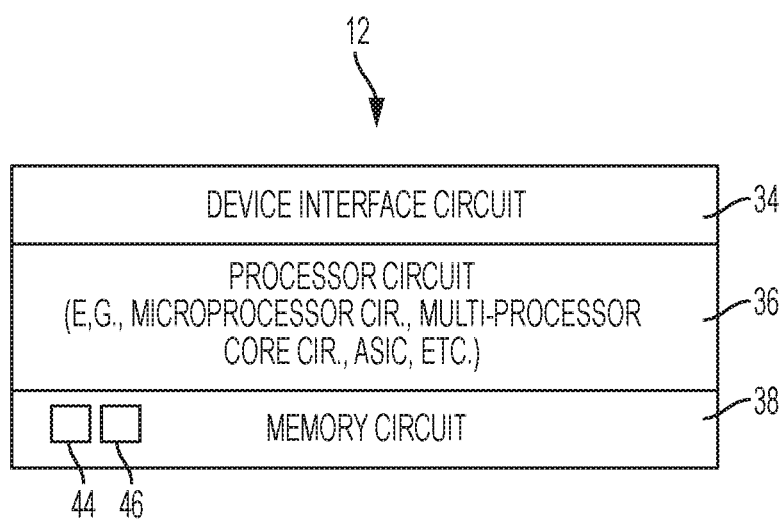
FIG. 2 illustrates an example implementation of any one of the network devices of FIG. 1, according to an example embodiment.

FIG. 2 illustrates an example implementation of any one of the network devices 12 of FIGS. 1A-1E, according to an example embodiment. Each apparatus 12 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12 can include a device interface circuit 34, a processor circuit 36, and a memory circuit 38. The device interface circuit 34 can include one or more distinct physical layer transceivers for communication with any one of the other devices 12; the device interface circuit 34 also can include an IEEE based Ethernet transceiver for communications with the devices of FIG. 1 via any type of data link (e.g., a wired or wireless link, an optical link, etc.). The processor circuit 36 can be configured for executing any of the operations described herein, and the memory circuit 38 can be configured for storing any data or data packets as described herein.

Any of the disclosed circuits of the devices 12 (including the device interface circuit 34, the processor circuit 36, the memory circuit 38, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 38) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 38 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 38 can be implemented dynamically by the processor circuit 36, for example based on memory address assignment and partitioning executed by the processor circuit 36.

Figure 3A:
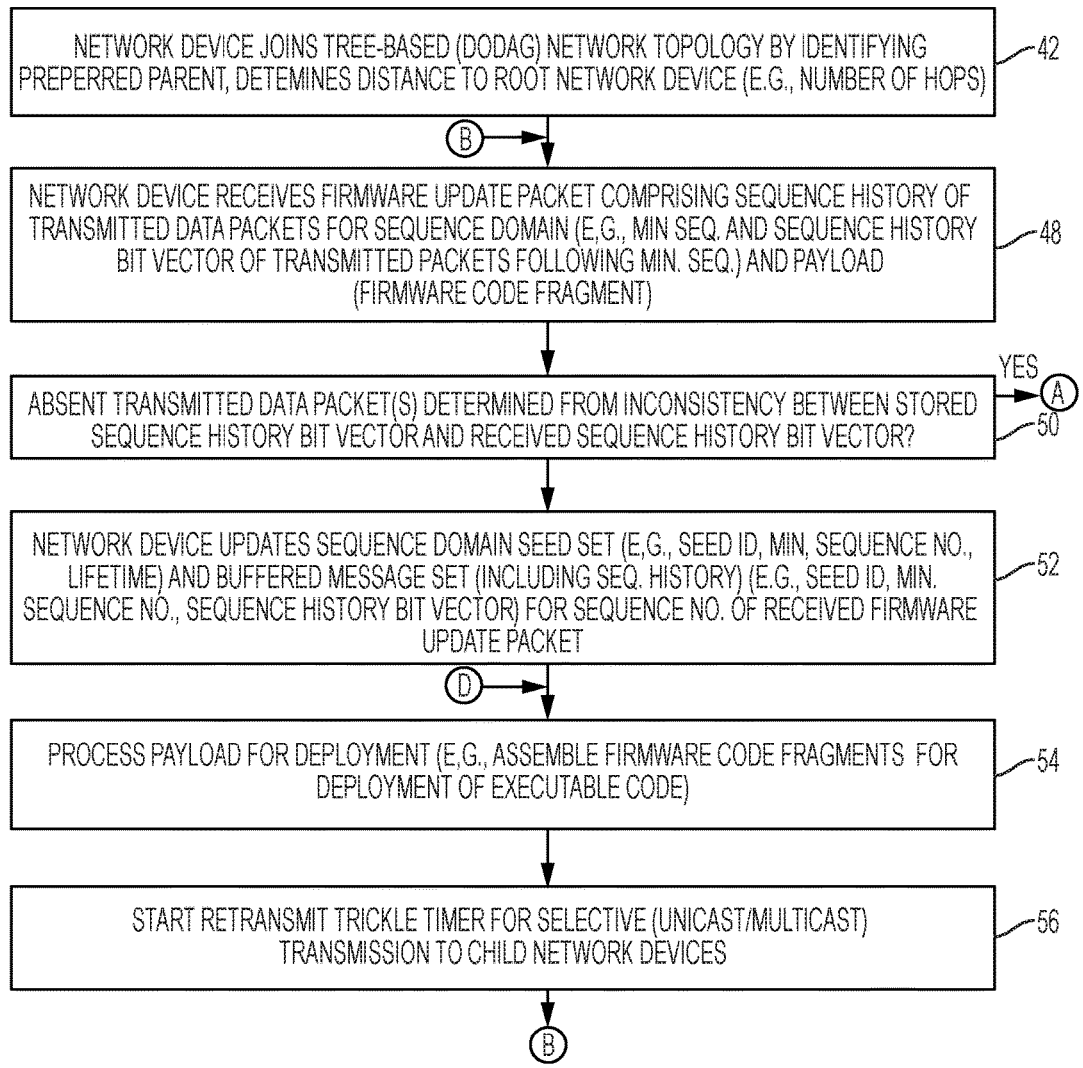
FIGS. 3A, 3B, and 3C summarize a method of executing constrained reliable multicast in a DAG based on deferred contention to higher devices, according to an example embodiment.
Figure 3B:
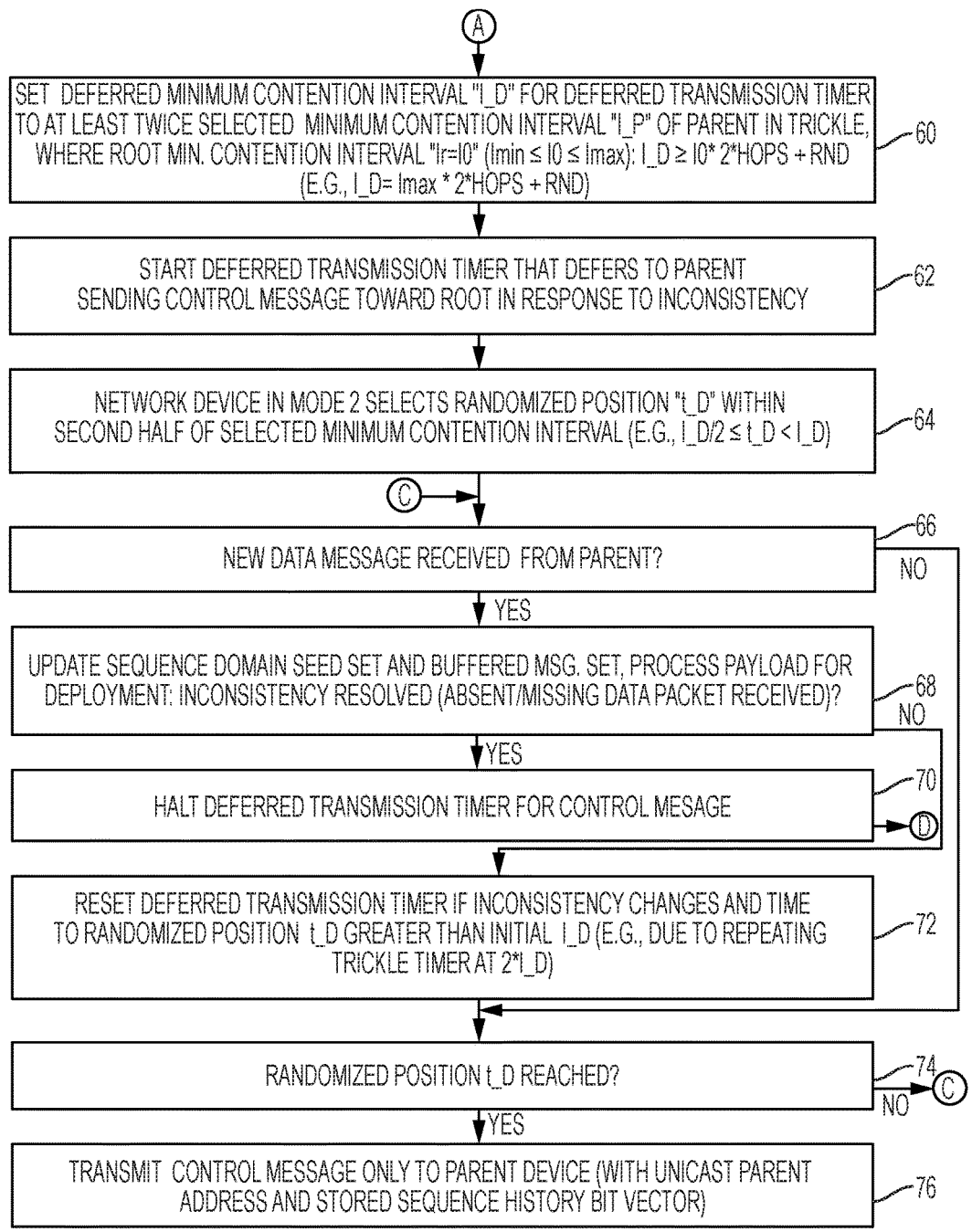
Figure 3C:
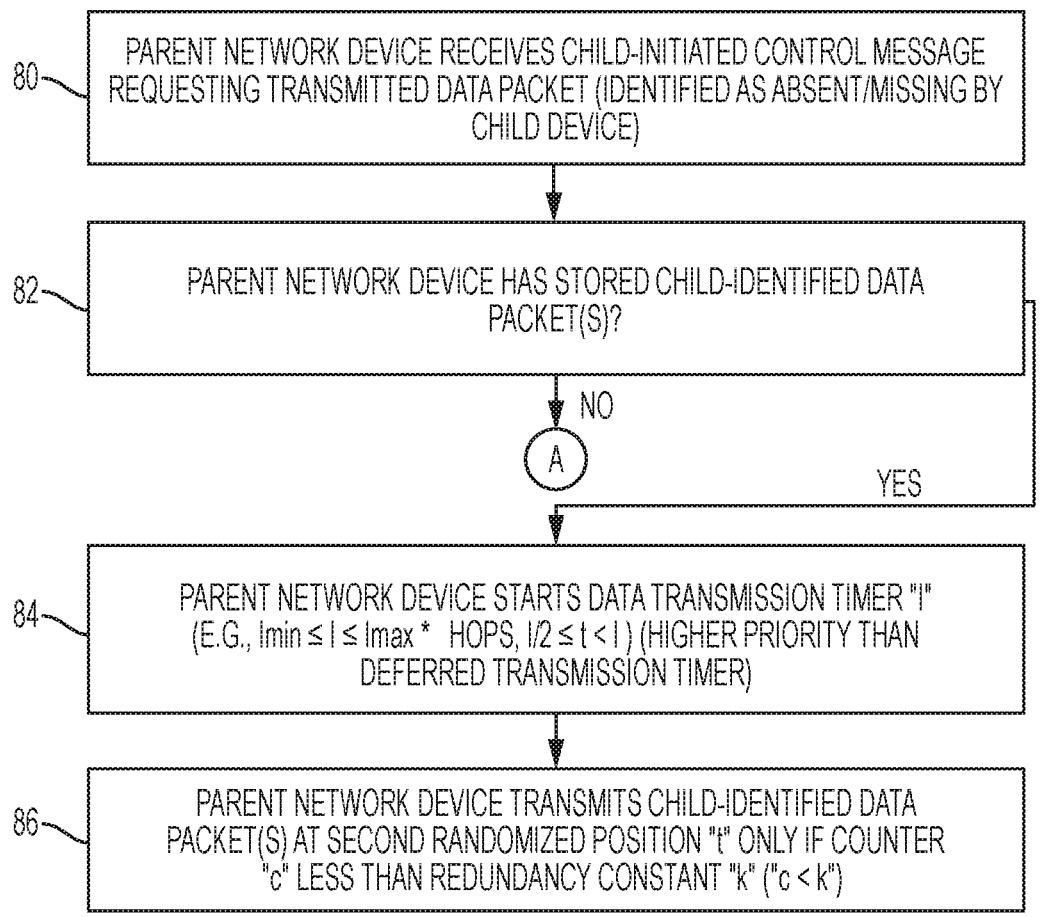

FIGS. 3A, 3B, and 3C summarize a method of executing constrained reliable multicast in a DAG based on deferred contention to higher devices, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Each network device 12 is configured for establishing the tree-based topology 16, for example according to RPL as described in RFC 6550. For example, the root network device 12 can be configured for outputting a DIO message advertising the tree-based topology 16, and each of network devices (e.g., "A", "B", and "C") within the transmission range 40r of the root network device "Root" 12 can join the tree-based (DODAG) topology 16 in operation 42 in response to receiving and processing the DIO message from the root network device "Root" 12: the DIO message can specify a "rank", "distance", hop count, etc., enabling the processor circuit 36 of a network device 12 receiving the DIO message to determine in operation 42 the distance of the source having transmitted the DIO message from the root network device 12. Hence, the processor circuit 36 of the network device "C" can determine its distance (e.g., 1 hop) from the root and in response output an updated DIO message, enabling the processor circuit 36 of each of the network devices "G" and "H" to join in operation 42 the tree-based topology 16, and determine their relative distances (e.g., 2 hops) to the root. The "distance" also can be expressed as an inverse of a "rank" specified in the DIO message. Further details on propagation of DIO messages for generation of the tree-based topology 16 can be found in RFC 6550.

Each network device 12 can be configured for storing in its memory circuit 38 a data structure 44 specifying prescribed settings for executing two modes of trickle-based operations, namely a first mode of selective transmission and/or retransmission of a unicast and/or a multicast data packet 20, and a second mode of selectively transmitting a control message 24 if a data packet is not received by the corresponding network device. The data structure 44 can include prescribed parameters for the first mode of selective transmission and/or retransmission of a unicast and/or multicast data packet 20, for example a prescribed minimum contention interval "Imin", a prescribed maximum contention interval "Imax", and a prescribed redundancy constant "k" (e.g., "k=2"). The first mode of selective transmission and/or retransmission of a unicast and/or a multicast data packet 20 are described in further detail below with respect to FIG. 3C. In summary, the device interface circuit 34 of a network device (e.g., the root network device "Root" 12) can output a multicast data packet 20, illustrated in FIG. 1.

As described below, each multicast data packet 20r output by the root-based network device includes a corresponding sequence identifier, and a transmit-history bit vector 22 identifying the corresponding transmit history of the root network device 12: the transmit-history bit vector 22 can correspond to a stored bit vector 46r that identifies the data packets having been transmitted by the root network device 12 (i.e., "transmitted data packets"). The transmit-history bit vector 22 can be implemented, for example, as the "buffered-mpl-messages" described in Section 6.2 of RFC 7731; if needed, the multicast data packet 20r also can identify a lower-bound sequence number, described in RFC 7731 as "min-seqno", identifying the lower-bound sequence number used by the root network device 12 in transmitting a sequence of multicast data packets 20, for example for propagation of a sequence of executable code fragments for reassembly by each child network device 12 as executable code (e.g., "firmware update code") for deployment in the child network device 12.

As illustrated in FIGS. 1A-1E, each of the network devices 12 comprises a corresponding stored bit vector 46 that can identify received and/or buffered messages that have been transmitted by the root network device 12 and received by the corresponding network device 12. Although FIGS. 1A-1E illustrate the corresponding stored bit vector 46 of only the network devices "Root", "A", "C", "D", "E", "G", and "H" to avoid cluttering in the Figures, it should be apparent that all the child network devices "A" through "N" 12 comprise a corresponding stored bit vector 46.

Assume with respect to FIG. 1A that the root network device 12 has previously transmitted multicast data packets 20r specifying the respective transmit-history bit vectors "10000", "11000", "11100", and "11110" 22, each associated with a "sequence domain" for an executable code (e.g. a prescribed firmware update) and carrying a corresponding executable code fragment of the prescribed firmware update. The multicast data packet 20 also can identify the currently-transitioning bit in the multicast data packet 20, if desired, which corresponds to the corresponding sequence identifier specified in the multicast data packet 20.

As illustrated in FIG. 1A and FIG. 3A, the device interface circuit 34 of each of the network devices "A" and "B" and "C" 12 within the transmission range 40r can receive in operation 48 the multicast data packets 20r (specifying the respective transmit-history bit vectors "10000", "11000", "11100"), and in response the corresponding processor circuit 36 in operation 50 can determine in operation 50, for each received data packet 20r, whether any inconsistency is detected between the stored sequence history bit vector 46 and the received sequence-history bit vector 22 (disregarding the currently-transitioning bit for the current multicast data packet 20).

Assuming that no inconsistency has been detected in operation 50 by the processor circuit 36 of each of the network devices "A" and "B" and "C" 12 that would indicate a determination of an "absent" transmitted data packet (described below), the processor circuit 36 of each of the network devices "A" and "B" and "C" 12 in operation 52 can update its corresponding stored bit vector 46 to include the currently-transitioning bit for the current multicast data packet 20: for example, the processor circuit 36 of each of the network devices "A" and "B" and "C" 12 can update its corresponding stored bit vector 46 from "00000" to "10000" in response receiving a first multicast data packet 20r specifying a corresponding transmit-history bit vector 22 of "10000" (the first bit representing the currently-transitioning bit); the processor circuit 36 of each of the network devices "A" and "B" and "C" 12 can update its corresponding stored bit vector 46 from "10000" to "11000" in response receiving a second multicast data packet 20r specifying a corresponding transmit-history bit vector 22 of "11000" (the second bit representing the currently-transitioning bit); and the processor circuit 36 of each of the network devices "A" and "B" and "C" 12 can update its corresponding stored bit vector 46 from "11000" to "11100" in response to receiving a third multicast data packet 20r specifying a corresponding transmit-history bit vector 22 of "11100" (the third bit representing the currently-transitioning bit). As illustrated in FIG. 1A, the network device "C" updates its corresponding stored bit vector 46c in response to the third multicast data packet 20r specifying a corresponding transmit-history bit vector 22 of "11100".

As illustrated in FIG. 3, the updating of the corresponding stored bit vector 46 in operation 50 can include updating a seed set for the sequence domain (specifying the "seed ID" of the sourcing root network device 12, the minimum sequence number used by the sourcing root network device 12 for the sequence domain associated with the firmware update, and the lifetime of the minimum sequence number maintained by the root network device 12) (see, e.g., RFC 7731), and updating a buffered message set that can include at least the seed ID, the minimum sequence number used by the sourcing root network device, and the sequence history bit vector illustrated in FIGS. 1A-1E. The stored bit vectors 46 illustrated in FIGS. 1A-1E also can be derived by each corresponding processor circuit 36 based on storing, in the memory circuit 38, a data structure that stores the seed set described above, and a buffered message set: the buffered message set can be configured for storing each received multicast data packet 20 (for at least a prescribed minimum lifetime), and further storing for each received multicast data packet 20 the seed ID, and the corresponding sequence number for the multicast data packet 20 that corresponds to the corresponding position in the corresponding sequence history bit vector 22 (see, e.g., RFC 7731).

The processor circuit 36 of each network device "A" and "B" and "C" 12 in operation 54 can process in operation 54 the corresponding payload in the received multicast data packet 20r for deployment, for example storing the corresponding code fragment in the memory circuit 38 until a sufficient number of code fragments have been received for assembling the executable code fragments into executable code for deployment and execution by the processor circuit 36.

The device interface circuit 34 of each of the network devices "A" and "B" and "C" 12 in operation 56 can start attempted retransmission of the received multicast data packet 20 that includes the corresponding transmit-history bit vector 22. Hence, FIG. 1A illustrates the network devices "C", "G", and "H" 12 updating their respective stored bit vectors 46 to "11100" in response to the successful reception of the multicast data packet 20r specifying the corresponding transmit-history bit vector 22 of "11100".

FIG. 1A illustrates that the network device "A" (and presumably the network device "B") 12 receiving the next multicast data packet 20r output by the root network device 12 and having a corresponding transmit-history bit vector 22 "11110", causing the network device "A" to update its stored bit vector 46a, and cause multicast transmission of the multicast data packet 20 (specifying the transmit-history bit vector 22 "11110"), enabling the network devices "D" and "E" to receive the multicast data packet 20 and update their respective stored bit vectors 46d and 46e to "11110".

As illustrated in FIG. 1A, none of the network devices "C", "G", or "H" received the multicast data packet 20 specifying the transmit-history bit vector 22 "11110", as their respective stored bit vectors 46c, 46g, and 46g each specify "11100" instead of the value "11110" as specified in the respective stored bit vectors 46a, 46d, and 46e. Hence, in response to the root network device 12 outputting the multicast data packet 20r specifying the transmit-history bit vector 22 of "11111" as illustrated in FIG. 1A, the processor circuit 36 of the network device "C" 12 in operation 50 can determine an inconsistency between the transmit-history bit vector 22 "11111" in the received multicast data packet 20 and the stored bit vector 46 "11100" (disregarding the last bit corresponding to the currently-transitioning bit). In response to detecting the absent transmitted data packet (e.g., based on an exclusive OR operation between the transmit-history bit vector 22 and the stored bit vector 46c while disregarding the currently-transitioning bit), the processor circuit 36 of the network device "C" executes the operations 52, 54, and 56, and in addition starts in FIG. 3B a deferred transmission timer for attempted transmission of a control message, described below.

As illustrated in FIG. 1B, the network devices "A" and "C" in operation 56 can multicast within their transmission ranges 40a and 40c the respective multicast data packets 20a and 20c, each specifying the transmit-history bit vector 22 "11111". Each of the network devices "D" and "E" can update their respective stored bit vectors 46d and 46e as described previously with respect to operations 48, 52, 54, with no detected inconsistency between the stored sequence history bit vector 46 and the received transmit-history bit vector 22; in contrast, the processor circuit 36 of each of the network devices "G" and "H" 12 in operation 50, like the network device "C" 12, can detect the inconsistency (e.g., based on an exclusive OR operation between the transmit-history bit vector 22 and the stored bit vector 46g or 46h while disregarding the currently-transitioning bit), and determine that a control message (24 of FIG. 1C) is needed for retransmission of the absent transmitted data packet (corresponding to the fourth bit ("00010") in the bit sequence) in the transmit-history bit vector 22 "11111".

According to example embodiments, each of the network devices "C", "G", and "H" in operation 60 can initiate the second mode of selectively transmitting a control message 24 if a data packet is not received by the corresponding network device, based on setting a selected minimum contention interval based on the corresponding distance of the network device 12 to the root network device "Root" 12. As described previously, the network device "C" is one hop away from the root network device "Root" 12, and the network devices "G" and "H" are children of network device "C" and therefore two (2) hops away from the root network device "Root" 12.

Hence, the processor circuit 36 of the parent network device "C" in operation 60 can set its deferred contention interval (I_P 28c of FIG. 1C) to at least twice the selected contention interval of the root network device, i.e., "I_P≥I0*2*HOPS*RND", where "HOPS=1" and "RND" is a random number; for example, the processor circuit 36 of the parent network device "C" in operation 60 can set its deferred contention interval 28c to equal "I_P=2*Imax+RND_C" to ensure the deferred contention interval 28c does not interfere with existing Trickle transmission operations of the root network device 12, for example a subsequent multicast data packet 20.

In contrast, the processor circuit 36 of the child network devices "G" and "H" in operation 60 each set its corresponding deferred contention interval "I_D" 26g, 26h to at least twice the corresponding selected minimum contention interval "I_P" 28c of the parent network device "C" 12. Hence, in operation 60 the processor circuit 36 of the network device "G" 12 can set its corresponding deferred minimum contention interval "I_D" 26g to a corresponding value of "I_D(G)=4*Imax+RND_G", and the processor circuit 36 of the network device "H" 12 can set its corresponding deferred minimum contention interval "I_D" 26h to a corresponding value of "I_D(H)=4*Imax+RND_H".

The processor circuit 36 of each network device "C", "G", and "H" in operation 62 starts its corresponding deferred transmission timer, and in operation 64 each network device "C", "G", and "H" selects a corresponding randomized position "t_D" that is within the second half of its selected minimum contention interval. As illustrated in FIG. 1C, the randomized position "t" 32c selected by the network device "C" 12 in operation 64 is within the second half of its minimum contention interval "I_P" 28c, the randomized position "t" 32g selected by the network device "G" 12 in operation 64 is within the second half of its minimum contention interval "I_D(G)" 26g, and the randomized position "t" 32h selected by the network device "H" 12 in operation 64 is within the second half of its minimum contention interval "I_D(H)" 26h.

The network device "C" 12 cannot attempt transmission of any control message 24 at least until reaching its randomized position 32c that is within the second half of its deferred contention interval 28c; similarly, the child network device "G" 12 cannot attempt transmission of any control message 24 at least until reaching its randomized position 32g that is within the second half of its deferred contention interval 26g, and the child network device "H" 12 cannot attempt transmission of any control message 24 at least until reaching its randomized position 32h that is within the second half of its deferred contention interval 26h.

Moreover, since each deferred minimum contention interval "I_D" 26g and 26h is more than twice as long in duration as the parent-selected minimum contention interval "I_P" 28c, the network device "C" is guaranteed to reach its randomized position "t" 32c before any of the child network devices "G" or "H" 12 reach their respective randomized positions "t" 32g or 32h, ensuring the network devices "G" and "H" 12 defer to the parent network device "C" 12 in attempting to transmit a control message 24, described below.

The processor circuit 36 of each of the network devices "C", "G", and "H" 12 determine in operation 66 if any new multicast data packet 20 is received while waiting for the corresponding trickle timer to reach the corresponding randomized position "t" 32c, 32g, or 32h, described below. Assuming in operation 66 that no new transmit-history bit vector 22 is received, the processor circuit 36 of each of the network devices "C", "G", and "H" 12 determines in operation 74 whether the corresponding randomized position is reached: as illustrated in FIG. 1C, the parent network device "C" can reach its corresponding randomized position "t" 32c before any of the child network devices "G" or "H" can reach their respective randomized positions 32g, 32h within the second half of the longer deferred minimum contention intervals 26g, 26h that are more than twice the duration of the parent-selected minimum contention interval "I_P" 28c.

Hence, the processor circuit 36 of the network device "C" 12 in operation 76 can cause its device interface circuit 34 to unicast transmit its control message 24 to only its parent network device, illustrated in FIG. 1C as the root network device 12: the control message 24 includes the stored bit vector 46c "11101", enabling and causing the root network device 12 to cause transmission of the absent transmitted data packet, namely the fourth multicast data packet 20 at bit position "00010" in the stored bit vector 46r and identified by its corresponding sequence identifier (the processor circuit 36 of the root network device 12 can identify the fourth multicast packet as the absent transmitted data packet, for example, based on executing an exclusive or (XOR) operation between its stored bit vector 46r and the received bit vector 46, i.e., "11111 XOR 11101=00010"). Moreover, the insertion of the unicast parent address into the destination address field of the control message 24 (instead of a link-scoped MPL domain address) constrains the distribution of the control message 24 to only the corresponding parent device, in this case the root network device 12.

FIG. 1C illustrates retransmission operations by a parent network device receiving a control message 24: although illustrated herein as the root network device 12, it will be readily apparent that another child network device (e.g., "E") can execute the operations described herein, for example in response to a corresponding control message 24 from a child network device "I" or "J", etc. As illustrated in FIG. 3C, the root network device (or another child network device "E") 12 in operation 80 can receive the child-initiated control message (e.g., 24 of FIG. 1C) that requests a transmitted data packet 30 as identified by the corresponding stored bit vector 46c "11101" 46c specified in the control message 24. In the case of a non-root network device "E" operating as a parent network device, if the parent network device in operation 82 does not have stored locally the child-identified data packet buffered in its memory circuit 38, the non-root network device (e.g. "E") can start its own deferred timer for selective transmission of a corresponding control message, as described previously with respect to FIG. 3B.

Assuming in operation 82 the parent network device has stored the child-identified data packet based on the corresponding stored bit vector 46c specified in the control message 24, the parent network device (e.g., the root network device, the parent network device "E", etc.) in operation 84 can start a data transmission Trickle timer "I" according to RFC 6206, where the selected minimum contention interval "I" for the data transmission defers to higher network devices (in the case of non-root devices), but still has higher priority than deferred transmission timers for any control message 24, based on having a value within the range of "Imin≤I≤Imax*HOPS" (except the root network device would use the range "Imin≤I≤Imax"), where the randomized position "t" is within the range of "I/2≤t<I". Hence, processor circuit 36 of the parent network device transmits in operation 86 the child-identified multicast data packet 20 at the second randomized position "t" only if the associated counter "c" is less than a prescribed redundancy constant "k" (i.e., "c<k"), as described in RFC 6206.

As illustrated in FIG. 1D, the root network device 12 in operation 86 can retransmit the absent transmitted data packet 30r specifying the corresponding transmit-history bit vector 22r "11111" (and the corresponding sequence identifier that identifies the corresponding transitioning bit "00010"), causing the processor circuit 36 of the network device "C" 12 in operation 48 of FIG. 3A to receive the retransmitted absent transmitted data packet 30r, and in response determine in operation 50 that there is no longer any inconsistency due to the retransmitted absent transmitted data packet 30. Hence, the processor circuit 36 of the network device "C" in operation 52 of FIGS. 1D and 3A can update its corresponding stored bit vector 46 to "11111", can process the payload for deployment in operation 54, and can start in operation 56 the retransmit trickle timer for selective multicast (or unicast) of the retransmitted absent transmitted data packet 30 containing the corresponding transmit-history bit vector 22r "11111" (and identifying the corresponding transitioning bit "00010").

As described previously, the data transmission trickle timer uses interval values "I" that are substantially less than the deferred minimum contention interval "I_D" 26g and 26h in use by the child network devices "G" and "H", respectively. Hence, the substantially longer durations of the randomized position "t" 32g and 32h can ensure that the network device "C" can send its control message 24, receive the response 30r from the root network device 12 as illustrated in FIG. 1D, and transmit the absent transmitted data packet 30c as illustrated in FIG. 1E, before the network devices "G" and "H" reach their respective randomized positions "t" 32g or 32h.

Hence, the network devices "G" and "H" that are within the transmission range 40c of the network device "C" 12 can respond in operation 66 of FIG. 3B to reception of the absent transmitted data packet 30c by updating in operation 68 their respective stored bit vectors 46g and 46h in response to the sequence identifier specified in the transmitted absent transmitted data packet 30c: in response to determining that the absent transmitted data packet 30c is the absent transmitted data packet that resolves the inconsistency, the processor circuit 36 in each of the network devices "G" and "H" 12 can halt in operation 70 their respective deferred transmission timers prior that have not yet reached the respective randomized positions 32g or 32h. The network devices "G" and "H" 12 can resume processing in operations 54 and 56 of FIG. 3A, described above.

According to example embodiments, unnecessary transmissions in a tree-based network topology can be minimized based on providing constrained reliable multicast using the tree-based network topology, where reliable multicast is constrained based on network devices deferring contention for transmission of control messages (to request retransmission of missing data packets) to higher network devices that are closer to the root network device. The deferred contention enables the higher network devices an opportunity to request the missing data packet by unicast transmitting a request to their parent, maximizing efficiency in causing retransmission of an absent transmitted data packet and minimizing the occurrence of multiple redundant retransmission requests by child network devices.

FIG. 3B also illustrates a variation that may involve multiple inconsistencies due to pending control messages 24. For example, if in operation 68 a new data message does not fully resolve the prior inconsistency detected by a network device but results in a different inconsistency (e.g., missing data packet "4" received but now network device detects missing data packet "6"), the processor circuit 36 of a network device 12 in operation 72 needs to reset its deferred transmission timer only if the current time to the corresponding randomized position "t" 32 exceeds the initial deferred minimum contention interval "I_D" 26 for the network device, for example due to an increase in the increase in the trickle timer each duration. Hence, the deferred transmission timer can be reset in operation 72 to avoid excessive delays in sending a request message that specifies an updated sequence history bit vector that supersedes the original stored sequence history bit vector that was partially resolved by the prior data packet.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving, by a network device via a tree-based topology of a data network, a data packet sourced from a root network device of the tree-based topology, the data packet including a data structure identifying transmitted data packets having been transmitted by the root network device;
   determining, by the network device, a distance to the root network device via the tree-based topology;
   determining, by the network device, one or more absent transmitted data packets based on the data structure; and
   the network device starting, in response to determining the one or more absent transmitted data packets, a deferred transmission timer that defers to a parent device based on requiring the network device to wait at least a first half of a selected minimum contention interval before attempting transmission at a randomized position within a second half of the selected minimum contention interval, the starting including setting the selected minimum contention interval to at least twice the corresponding selected minimum contention interval of the parent device based on the distance; and the network device selectively transmitting a control message to the parent device to cause transmission of the one or more absent transmitted data packets only if, upon reaching the corresponding randomized position of the deferred transmission timer, the network device has not received the one or more absent transmitted data packets.

2. The method of claim 1, wherein the determining of the one or more absent transmitted data packets includes determining an inconsistency between the data structure and a stored data structure that is stored in the network device, the stored data structure identifying at least a portion of the transmitted data packets having been received by the network device, the determined inconsistency identifying the one or more absent transmitted data packets that have not been received by the network device.

3. The method of claim 2, further comprising:
receiving, by the network device via the tree-based topology, a second data packet including a second data structure identifying second transmitted data packets having been previously transmitted by the root network device;
updating the stored data structure in response to the second data packet; and
selectively halting the deferred transmission timer, causing terminating selective transmission of the control message, in response to determining the second data packet resolves any inconsistency between the stored data structure and the second data structure, the resolution in inconsistency indicating the one or more absent transmitted data packets has been received by the network device.

4. The method of claim 3, further comprising:
detecting one or more second absent transmitted data packets based on the second data structure that supersedes the determined absence of the one or more absent transmitted data packets;
maintaining the deferred transmission timer in response to detecting the second absence; and
selectively transmitting, to the parent device, a second control message that supersedes the control message only if, upon reaching the corresponding randomized position, the network device has not received the one or more second absent transmitted data packets.

5. The method of claim 1, further comprising:
receiving, by the network device, a child-initiated control message requesting a child-identified one or more of the transmitted data packets;
determining the network device has stored at least one of the child identified transmitted data packets;
the network device starting a data transmission timer that requires the network device to wait at least a corresponding first half of a prescribed minimum contention interval before attempting transmission of the at least one child identified transmitted data packets at a corresponding second randomized position, the prescribed minimum contention interval less than the selected minimum contention interval.

6. The method of claim 1, wherein the data packet and the transmitted data packets each comprise a payload containing a corresponding executable code fragment, the method further comprising:
receiving, by the network device, the one or more absent transmitted data packets; and
assembling by the network device, from the executable code fragments of the transmitted data packets, an executable code for deployment in the network device.

7. The method of claim 1, wherein the selectively transmitting includes inserting a unicast address of the parent device into the control message for unicast transmission of the control message to the parent device.

8. An apparatus comprising:
a device interface circuit configured for receiving, via a tree-based topology of a data network, a data packet sourced from a root network device of the tree-based topology, the data packet including a data structure identifying transmitted data packets having been transmitted by the root network device; and
a processor circuit configured for determining a distance to the root network device via the tree-based topology, and further configured for determining one or more absent transmitted data packets based on the data structure;
the processor circuit further configured for starting, in response to determining the one or more absent transmitted data packets, a deferred transmission timer that defers to a parent device based on requiring the apparatus to wait at least a first half of a selected minimum contention interval before attempting transmission at a randomized position within a second half of the selected minimum contention interval, the processor circuit configured for setting the selected minimum contention interval to at least twice the corresponding selected minimum contention interval of the parent device based on the distance;
the processor circuit configured for selectively causing the device interface circuit to transmit a control message to the parent device to cause transmission of the one or more absent transmitted data packets only if, upon reaching the corresponding randomized position of the deferred transmission timer, the apparatus has not received the one or more absent transmitted data packets.

9. The apparatus of claim 8, further comprising a memory circuit configured for storing a stored data structure;
wherein the processor circuit further is configured for determining the one or more absent transmitted data packets in response to determining an inconsistency between the data structure and the stored data structure, the stored data structure identifying at least a portion of the transmitted data packets having been received by the apparatus, the determined inconsistency identifying the one or more absent transmitted data packets that have not been received by the apparatus.

10. The apparatus of claim 9, wherein:
the device interface circuit is configured for receiving, via the tree-based topology, a second data packet including a second data structure identifying second transmitted data packets having been previously transmitted by the root network device;
the processor circuit configured for updating the stored data structure in response to the second data packet; and
the processor circuit configured for selectively halting the deferred transmission timer, causing terminating selective transmission of the control message, in response to determining the second data packet resolves any inconsistency between the stored data structure and the second data structure, the resolution in inconsistency indicating the one or more absent transmitted data packets has been received by the apparatus.

11. The apparatus of claim 10, wherein:
the processor circuit is configured for detecting one or more second absent transmitted data packets based on the second data structure that supersedes the determined absence of the one or more absent transmitted data packets;
the processor circuit is configured for maintaining the deferred transmission timer in response to detecting the second absence; and
the processor circuit is configured for causing the device interface circuit to selectively transmit, to the parent device, a second control message that supersedes the control message only if, upon reaching the corresponding randomized position, the apparatus has not received the one or more second absent transmitted data packets.

12. The apparatus of claim 8, wherein:
the apparatus further comprises a memory circuit;
the device interface circuit is configured for receiving a child-initiated control message requesting a child-identified one or more of the transmitted data packets;
the processor circuit configured for determining at least one of the child identified transmitted data packets is stored in the memory circuit;
the processor circuit configured for starting a data transmission timer that requires the apparatus to wait at least a corresponding first half of a prescribed minimum contention interval before attempting transmission of the at least one child identified transmitted data packets at a corresponding second randomized position, the prescribed minimum contention interval less than the selected minimum contention interval.

13. The apparatus of claim 8, wherein:
the data packet and the transmitted data packets each comprise a payload containing a corresponding executable code fragment;
the processor circuit further configured for responding to receiving the one or more absent transmitted data packets by assembling, from the executable code fragments of the transmitted data packets, an executable code for execution by the processor circuit in the apparatus.

14. The apparatus of claim 8, wherein the processor circuit is configured for inserting a unicast address of the parent device into the control message for unicast transmission of the control message to the parent device.

15. One or more non-transitory tangible media encoded with logic for execution by a machine and when executed by the machine operable for:
receiving, by the machine implemented as a network device via a tree-based topology in a data network, a data packet sourced from a root network device of the tree-based topology, the data packet including a data structure identifying transmitted data packets having been transmitted by the root network device;
determining, by the network device, a distance to the root network device via the tree-based topology;
determining, by the network device, one or more absent transmitted data packets based on the data structure;
the network device starting, in response to determining the one or more absent transmitted data packets, a deferred transmission timer that defers to a parent device based on requiring the network device to wait at least a first half of a selected minimum contention interval before attempting transmission at a randomized position within a second half of the selected minimum contention interval, the starting including setting the selected minimum contention interval to at least twice the corresponding selected minimum contention interval of the parent device based on the distance; and
the network device selectively transmitting a control message to the parent device to cause transmission of the one or more absent transmitted data packets only if, upon reaching the corresponding randomized position of the deferred transmission timer, the network device has not received the one or more absent transmitted data packets.

16. The one or more non-transitory tangible media of claim 15, wherein the determining of the one or more absent transmitted data packets includes determining an inconsistency between the data structure and a stored data structure that is stored in the network device, the stored data structure identifying at least a portion of the transmitted data packets having been received by the network device, the determined inconsistency identifying the one or more absent transmitted data packets that have not been received by the network device.

17. The one or more non-transitory tangible media of claim 16, further operable for:
receiving, via the tree-based topology, a second data packet including a second data structure identifying second transmitted data packets having been previously transmitted by the root network device;
updating the stored data structure in response to the second data packet; and
selectively halting the deferred transmission timer, causing terminating selective transmission of the control message, in response to determining the second data packet resolves any inconsistency between the stored data structure and the second data structure, the resolution in inconsistency indicating the one or more absent transmitted data packets has been received by the network device.

18. The one or more non-transitory tangible media of claim 15, further operable for:
receiving, by the network device, a child-initiated control message requesting a child-identified one or more of the transmitted data packets;
determining the network device has stored at least one of the child identified transmitted data packets;
starting a data transmission timer that requires the network device to wait at least a corresponding first half of a prescribed minimum contention interval before attempting transmission of the at least one child identified transmitted data packets at a corresponding second randomized position, the prescribed minimum contention interval less than the selected minimum contention interval.

19. The one or more non-transitory tangible media of claim 15, wherein the data packet and the transmitted data packets each comprise a payload containing a corresponding executable code fragment, the one or more non-transitory tangible media further operable for:
receiving, by the network device, the one or more absent transmitted data packets; and
assembling by the network device, from the executable code fragments of the transmitted data packets, an executable code for deployment in the network device.

20. The one or more non-transitory tangible media of claim 15, wherein the selectively transmitting includes inserting a unicast address of the parent device into the control message for unicast transmission of the control message to the parent device.

\* \* \* \* \*